United States Patent
Dallas et al.

(10) Patent No.: US 12,319,784 B2
(45) Date of Patent: Jun. 3, 2025

(54) POLYMERIC MATERIAL AND USE THEREOF

(71) Applicant: VICTREX MANUFACTURING LIMITED, Thornton Cleveleys (GB)

(72) Inventors: Connor Dallas, Thornton Cleveleys (GB); Samuel Hoggarth, Thornton Cleveleys (GB); Ulutan Tahsin, Thornton Cleveleys (GB); Adam Chaplin, Thornton Cleveleys (GB)

(73) Assignee: Victrex Manufacturing Limited, Thornton Cleveleys (GB)

( * ) Notice: Subject to any disclaimer, the term of this patent is extended or adjusted under 35 U.S.C. 154(b) by 0 days.

(21) Appl. No.: 18/010,930

(22) PCT Filed: Jun. 18, 2021

(86) PCT No.: PCT/GB2021/051550
§ 371 (c)(1),
(2) Date: Dec. 16, 2022

(87) PCT Pub. No.: WO2021/255470
PCT Pub. Date: Dec. 23, 2021

(65) Prior Publication Data
US 2024/0239959 A1 Jul. 18, 2024

(30) Foreign Application Priority Data
Jun. 18, 2020 (GB) ..................... 2009358

(51) Int. Cl.
*C08G 65/40* (2006.01)
*B29C 64/118* (2017.01)
*B29C 64/153* (2017.01)
*B33Y 10/00* (2015.01)
*B33Y 70/10* (2020.01)
*C08L 71/00* (2006.01)
*C08L 71/12* (2006.01)

(52) U.S. Cl.
CPC ........ *C08G 65/4012* (2013.01); *B29C 64/118* (2017.08); *B29C 64/153* (2017.08); *B33Y 10/00* (2014.12); *B33Y 70/10* (2020.01); *C08L 71/00* (2013.01); *C08L 71/12* (2013.01); *C08G 2140/00* (2013.01); *C08G 2650/40* (2013.01)

(58) Field of Classification Search
CPC ....... B33Y 10/00; B33Y 70/10; B29C 64/118; B29C 64/153; C08L 71/00; C08L 71/12; C08G 2650/40; C08G 65/4012
See application file for complete search history.

(56) References Cited

U.S. PATENT DOCUMENTS

| | | |
|---|---|---|
| 4,996,287 A | 2/1991 | Bloom |
| 10,023,691 B2 | 7/2018 | Capra et al. |
| 2009/0295042 A1 | 12/2009 | Pfister et al. |
| 2016/0053106 A1 | 2/2016 | Mazahir et al. |
| 2016/0053107 A1 | 2/2016 | Mazahir et al. |
| 2016/0115314 A1 | 4/2016 | Brule et al. |

FOREIGN PATENT DOCUMENTS

| | | |
|---|---|---|
| WO | WO 2019150060 A1 | 8/2019 |
| WO | WO 2019197587 A1 | 10/2019 |
| WO | WO 2019229442 A1 | 12/2019 |

OTHER PUBLICATIONS

International Search Report and Written Opinion mailed Sep. 15, 2021, Int'l Appl. No. PCT/GB2021/051550, 8 pages.
Risse et al., Synthesis of Soluble High Molecular Weight Poly(aryl ether ketones) Containing Bulky Substituents, Macromolecules, 1990, 23(18): 4030-4033.

*Primary Examiner* — John M Cooney
*Assistant Examiner* — Jeffrey S Lenihan
(74) *Attorney, Agent, or Firm* — Casimir Jones, S.C.; Anne M. Reynolds

(57) ABSTRACT

A polyaryletherketone PAEK polymeric material and use thereof is disclosed, the polymeric material comprising a homopolymer and/or a copolymer, suitable for use in an additive manufacturing process to make an object. The PAEK polymeric material has a shear viscosity, SV, of at least 145 Pa·s and less than 350 Pa·s, measured using capillary rheometry operating at 400° C. at a shear rate of 1000 s$^{-1}$ using a circular cross-section tungsten carbide die, 0.5 mm (capillary diameter)×8 mm (capillary length). The PAEK polymeric material has an isothermal crystallinity half life, $T_{1/2}$, of greater than 12 minutes at a temperature of 280° C., measured by Differential Scanning Calorimetry, DSC.

14 Claims, 1 Drawing Sheet

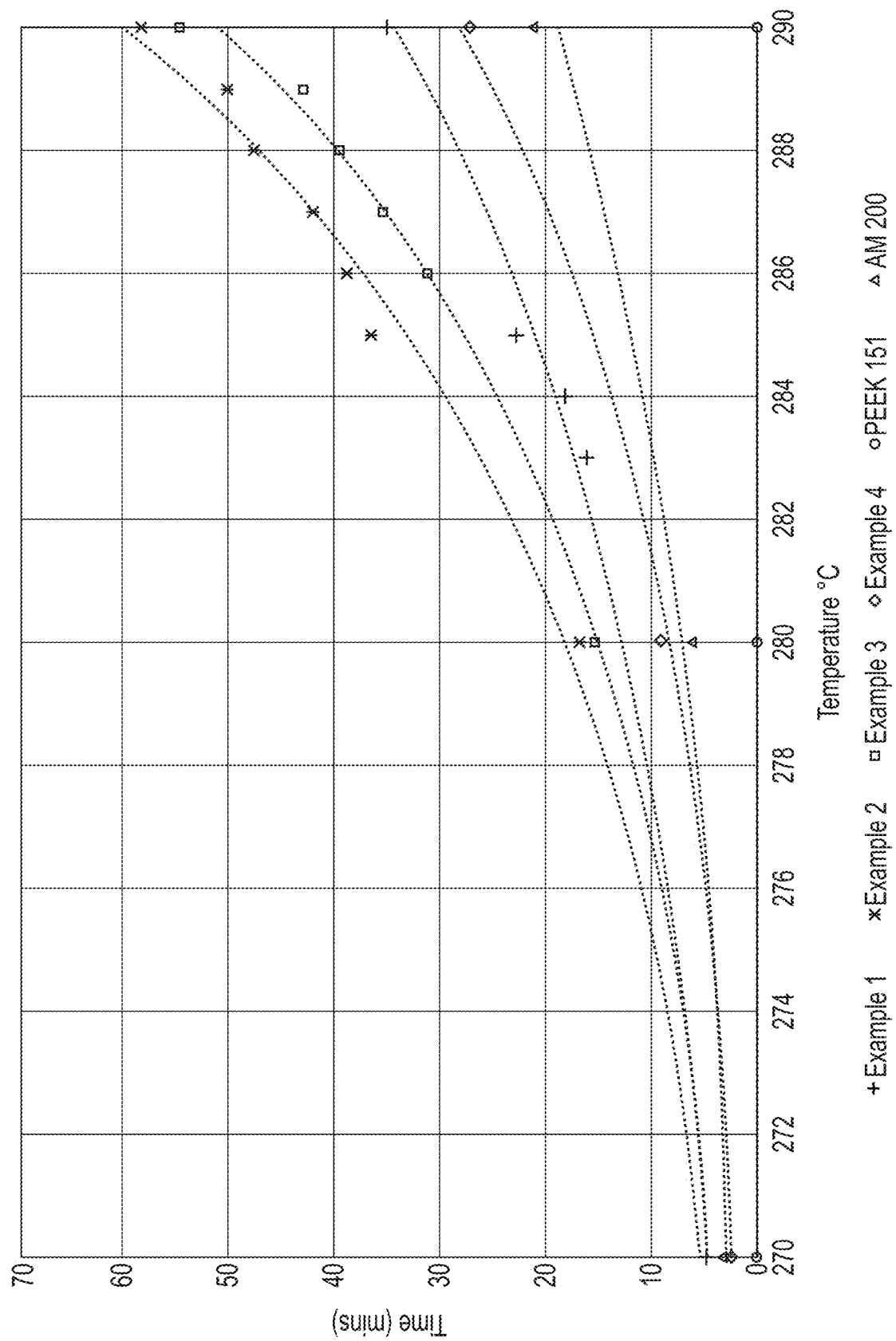

POLYMERIC MATERIAL AND USE THEREOF

The invention relates to the use of polymeric material in additive manufacturing (AM) processes. The invention also extends to the use of polyaryletherketones polymers and copolymers adapted for different additive manufacturing processes.

Methods in which rapid manufacturing of components is carried out from construction data under computer control are sometimes referred to as rapid prototyping methods. A well-known approach named additive manufacturing (AM) concerns the step-wise (often layer-wise) construction of a component from a shapeless material or a material that is neutral with respect to shape. Typically a three-dimensional model of a component to be fabricated is provided to an apparatus (e.g. an additive manufacturing apparatus such as a printer capable of printing in three-dimensions), which then autonomously fabricates the component by gradually depositing, or otherwise forming, the constituent material in the shape of the component to be fabricated. Successive parts (e.g. layers or slices) of material that represent cross-sections of the component may be deposited or otherwise formed; generally, the deposited parts/layers of material fuse (or otherwise solidify) to form the final component.

Originally, additive layer manufacturing methods were limited to prototyping, but now different methods are used for component manufacture. In this specification, such methods will be referred to by the term additive layer manufacturing (ALM), indicating that 3D parts are constructed by the build-up of successive layers. This may be contrasted with traditional manufacturing by machining, in which material is removed or "subtracted" from a starting blank in order to arrive at a desired component shape.

One such technique is Fused Deposition Modelling™ (FDM), also known as fused filament fabrication (FFF), in which generally a feedstock material 1 is fed into a heated print-head 2, which may be movable in a number of different directions, and then extruded in molten form 3 to print a part (e.g. a layer) of build material 4. The stepwise addition of further layers can occur continuously until the desired three-dimensional component 5 has been created. The feedstock material 2 may be in the form of a filament on a reel 6 and in some cases two or more different filaments may be simultaneously melted and then printed selectively. For instance, one of the filaments may comprise a support material 7 which is needed only at locations above which an overhanging part of the three-dimensional component 5 is printed and requires support during the subsequent printing procedure. The extruded support material 8 can be removed subsequently, e.g. via dissolution in acids, bases or water and other solvents. Support structures such as breakaway supports are also used whereby the support structure is mechanically removed post printing. The build material 4 forms the actual three-dimensional component 5. The extrusion is carried out on a build platform 9 which may be movable in several different directions. There are a number of processes related to FFF and FDM that employ slight modifications, for example melt extrusion manufacturing (MEM) or selective deposition modelling (SDM). In other examples, feedstock material may be supplied as short filaments, rods, micropellets or granules. The feedstock is then placed in a feedstock hopper and fed through an extruder to a nozzle or printhead and printed as described above.

Whilst FFF is advantageous in terms of its economic use of materials, it would be beneficial to provide process improvements such as better adhesion between adjacent layers of extruded material. In order to build up a three-dimensional component with good mechanical strength, it is necessary to adequately fuse together successive layers/parts of material. However, poor adhesion between adjacent layers can result, in particular in the "z" or vertical direction (i.e. where an upper layer is extruded on top of a lower layer) because the lower layer has had longer to cool down (and therefore harden) when compared with adhesion of the lower layer to adjacent layers in the horizontal ("x" and "y") directions.

Automated fibre placement (AFP) may also be thought of as additive manufacturing technique. Here the focus is on an automated process to apply sequential layers of fibre to form a composite part. There are many parallels between automated manufacturing processes such as AFP and additive manufacturing processes such as filament fusion fabrication and selective laser sintering that warrant a consideration of the polymeric materials used in such processes, in combination. For the purpose of the present invention, we consider AFP as additive processes because layers are sequentially added together.

Powder bed fusion and selective laser sintering are also additive manufacturing techniques whereby components are formed in a layer by layer process. Such processes may require long build times over several hours or days. In such processes, polymeric materials may be held at elevated temperatures for long periods of time.

Certain powder bed fusion and selective laser sintering techniques use different bed temperatures and laser powers depending on the build material.

Since parts made by additive process are formed layer by layer, it takes some time to form the final part. This can cause problems when manufacturing components using PAEKs because PAEKs typically crystallise rapidly as they cool. For example, in FFF, it takes time for a print head to complete depositing a layer of material and therefore they may be considerable time between sequential layers of material. The preceding layer may have cooled down such that the preceding layer has crystallised making fusion between the preceding layer and the subsequent layer difficult. With PAEK polymers, the rate of solidification is far quicker than with amorphous polymers because PAEKs can crystallise rapidly therefore the preceding layer may solidify far quicker than a layer of amorphous polymer. Crystallisation therefore locks in the shape of the polymer.

A wide range of different types of polymeric materials have been proposed for use as building materials in additive manufacturing processes. Poly(aryletherketone) homopolymers and copolymers, have been found to be particularly useful, as components that have been manufactured from PAEK based materials are typically characterised by a low flammability, good biocompatibility as well as a high resistance against hydrolysis and radiation. Thermal resistance at elevated temperatures and chemical resistance distinguishes PAEK based materials from conventional polymer materials such as polyamides, polyesters and the like. The high performance characteristics of PAEK polymers, combined with their low density, make them of use in the aerospace industry, in the automotive industry, in the electronic industry and in the medical industry. However, the rapid crystallisation of PAEK homopolymers and copolymers can create a challenge for additive manufacturing processes due to the relatively slow cycle times of additive manufacturing processes compared with more traditional manufacturing techniques such as injection moulding and compression moulding. Current processes for improving mechanical properties of moulded parts include post manufacturing annealing of printed parts but this adds an additional processing step that is both costly and time-consuming.

It is an object of the invention to address one or more of the above described problems.

According to a first aspect, there is provided a polyaryletherketone PAEK polymeric material comprising a homopolymer and/or a copolymer, suitable for use in an additive manufacturing process to make an object, the PAEK polymeric material having a shear viscosity, SV, of at least 145 Pa·s and less than 350 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK homopolymer or copolymer has an isothermal crystallinity half life, $T_{1/2}$, of greater than 12 minutes at a temperature of 280° C., measured by Differential Scanning Calorimetry, DSC.

By selecting a particular PAEK polymeric material having a crystallinity half life as described and thereby modified crystallisation kinetics for additive manufacturing processes, the mechanical properties of a manufactured object may be improved. Without controlling the crystallisation kinetics of the polymeric material for a given additive manufacturing process, manufactured parts may be brittle and weak. Without being bound by theory, the crystallisation kinetics of the PAEK polymeric material are modified by modifying the polymerisation of the PAEK polymeric material so as to modify the polymer backbone which determines how the PAEK polymeric material solidifies throughout the additive manufacturing process.

Optionally, the polymer backbone is modified by selecting the structure of the repeat unitunits and/or by controlling the ratio of repeat units in the PAEK polymeric material.

For example, polymer backbone is modified by changing the ratio (x:y) of repeat units in a copolymer, where a first repeat unit is x and a second repeat unit is y.

In an preferred example, the PAEK polymeric material is a PAEK copolymer.

In one example, the PAEK copolymer may be a polyetherketoneketone, PEKK. The PEKK copolymer may comprise a combination of PEKK repeat units whereby a proportion of the PEKK repeat units include-1,4-linkages and a proportion of the PEKK repeat units include-1,3-linkages.

The -1,3-linked PEKK repeat unit is inherently less crystalline than the -1,4-PEKK linked PEKK repeat, and the combination of repeat units having -1,4-linkages and -1,3-linkages modifies the polymer backbone and disrupts the ability of the polymer to crystallise. This in turn leads to a lower rate of crystallisation.

Alternatively, a co-repeat unitwith a bulky side-group (for instance a phenyl group) may be incorporated into the PAEK homopolymer in order to reduce the tendency to crystallise. For instance, in the polymer formed from x and y shown below, a ratio of x:y of 49:1 increased the isothermal crystallisation half life $T_{1/2}$ at 310° C. from approximately 1 minute (for 100% PEEK of the same SV, 130 Pas at 400° C.) to 40 minutes.

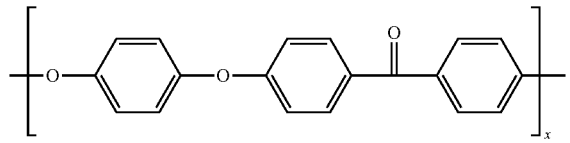

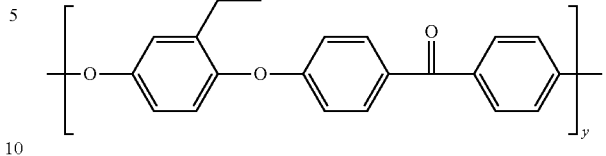

Optionally, the PAEK copolymer comprises different repeat units.

Optionally, the copolymer comprises repeat units of formula

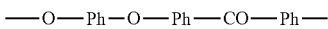

and a repeat unit of formula

wherein Ph represents a phenylene moiety, wherein at least 95 mol % of the copolymer repeat units are repeat units of formula I and of formula II; wherein the repeat units I and II have a molar ratio 1:11 from 60:40 to 80:20.

In a preferred example, the copolymer comprises repeat units of formula

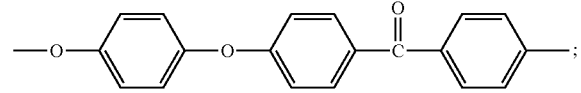

repeat units of formula

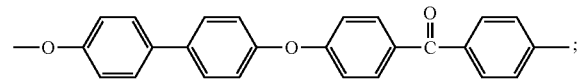

wherein at least 95 mol % of the copolymer repeat units are repeat units of formula I and of formula III; wherein the repeat units Ill and IV have a molar ratio III:IV from 60:40 to 80:20.

It has been surprisingly found that a PAEK polymeric material used in a particular additive manufacturing process, said PAEK polymeric material having modified crystallisation kinetics, results in components exhibiting improved mechanical properties. This is because the crystallisation kinetics of the polymers determine how the material solidifies through the manufacturing process and controlling the rate of crystallisation to complement the manufacturing process results in improved interlayer adhesion in layer by layer manufacturing processes.

In one example, the additive manufacturing process is an automated fibre placement, AFP, process, and the PAEK polymeric material has a preferred shear viscosity, SV, of at least 200 Pa·s and less than 280 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 20 mins and less than 50 mins at 290° C. More preferably, the isothermal crystallinity half life, $T_{1/2}$, of greater than 30 mins at 290° C., and even more preferably greater than 32 minutes. More preferably, the isothermal crystallinity half life, $T_{1/2}$, of less than 40 mins at 290° C., and even more preferably less than 38 minutes.

In another example, the additive manufacturing process is a powder bed fusion process, and the PAEK polymeric material has a preferred shear viscosity, SV, of at least 240 Pa·s and less than 350 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 40 mins and less than 80 mins at 290° C. More preferably, the isothermal crystallinity half life, $T_{1/2}$, of greater than 50 mins at 290° C., and even more preferably greater than 55 minutes. More preferably, the isothermal crystallinity half life, $T_{1/2}$, of less than 70 mins at 290° C., and even more preferably less than 62 minutes.

In one example, the powder bed fusion process is one in which the powder bed is held at a low temperature and electromagnetic radiation is used to melt the powder at specific locations in a selective manner.

In a preferred example, the PAEK polymeric material is a copolymer suitable for use in the powder bed fusion process, has a repeat unit ratio of at least 62:38 and less than 68:32.

In a preferred example, the PAEK copolymer suitable for use in the powder bed fusion process, has a particle size distribution, PSD, wherein the D50 ranges from 45 to 60 μm, the D10>14 μm and the D90<136 μm.

In another example, the additive manufacturing process is a filled filament fusion fabrication process, and the PAEK polymeric material has a preferred shear viscosity, SV, of at least 145 Pa·s and less than 205 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 35 mins and less than 75 mins at 290° C. More preferably, the isothermal crystallinity half life, $T_{1/2}$, of greater than 45 mins at 290° C., and even more preferably greater than 65 minutes. More preferably, the isothermal crystallinity half life, $T_{1/2}$, of less than 58 mins at 290° C., and even more preferably less than 38 minutes.

In a preferred example, the PAEK polymeric material is a copolymer suitable for use in the filled filament fusion fabrication process, and has a repeat unit ratio of at least 60:40 and less than 70:30. In an even more preferred example, the repeat unit ratio is 65:35 and the SV is approximately 155 Pa·s.

In another example, the additive manufacturing process is an unfilled filament fusion fabrication process, and the PAEK polymeric material has a preferred shear viscosity, SV, of at least 200 Pa·s and less than 280 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 15 mins and less than 45 mins at 290° C. More preferably, the isothermal crystallinity half life, $T_{1/2}$, of greater than 20 mins at 290° C., and even more preferably greater than 24 minutes. More preferably, the isothermal crystallinity half life, $T_{1/2}$, of less than 35 mins at 290° C., and even more preferably less than 30 minutes.

In a preferred example, the PAEK copolymer suitable for use in the filled filament fusion fabrication process, has a repeat unit ratio of at least 60:40 and less than 70:30. In an even more preferred example, the repeat unit ratio is 65:35 and the SV is approximately Pa·s.

It has been surprisingly found that such components exhibit superior mechanical properties especially in the direction normal to the plane of a build platform (z-direction).

According to a further aspect, there is provided the use of a polyaryletherketone, PAEK, polymeric material in an additive manufacturing process to make an object, as described in the first aspect.

Specific embodiments of the invention will now be described by reference to the following Examples.

FIG. 1 provides isothermal crystallinity half life values for a number of examples.

EXAMPLE 1—PREPARATION OF POLYETHERETHERKETONE (PEEK) POLYETHERDIPHENYLETHERKETONE (PEDEK) COPOLYMER AT 75:25 REPEAT UNIT RATIO

A 0.5 litre flanged Hastelloy pot fitted with a ground glass lid, stirrer/stirrer guide, nitrogen inlet and outlet was charged with 4,4'-diflurobenzophenone (110.95 g, 0.508 mol), 1,4-dihydroxybenzene (41.29 g, 0.375 mol), 4,4'-dihydroxydiphenyl (23.28, 0.125 mol) and diphenylsulphone (275.00 g) and purged with nitrogen for 1 hour. The contents were then heated under a nitrogen blanket to 160° C. to form an almost colourless solution. Whilst maintaining a nitrogen blanket, dried sodium carbonate (53.00 g, 0.500 mol) and potassium carbonate (2.75 g, 0.020 mol), both sieved through a screen with a mesh size of 500 micrometres, were added. The temperature was raised to 200° C. at a rate of 0.75° C./min and then to 240° C. at a rate of 0.5° C./min before finally being heated to 305° C. at 1° C./min and held for approximately 200 minutes or until the desired SV was reaches as indicted by the torque rise on the stirrer. The required torque rise was determined from a calibration graph of torque rise versus SV. The reaction mixture was then poured into a metal tray, allowed to cool, milled and washed with 2 litres of acetone and then with warm water at a temperature of 40-50° C. until the conductivity of the waste water was <2 μS. The resulting polymer powder was dried in an air oven for 12 hours at 120° C.

The resulting polymer had a Shear Viscosity (SV) of 290 Pa·s at a temperature of 400° C. and a shear rate of 1000 s$^{-1}$, as measured by capillary rheometry.

EXAMPLE 2—PREPARATION OF POLYETHERETHERKETONE (PEEK) POLYETHERDIPHENYLETHERKETONE (PEDEK) COPOLYMER AT 70:30 REPEAT UNIT RATIO

A 0.5 litre flanged Hastelloy pot fitted with a ground glass lid, stirrer/stirrer guide, nitrogen inlet and outlet was charged with 4,4'-diflurobenzophenone (110.95 g, 0.508 mol), 1,4-dihydroxybenzene (38.55 g, 0.350 mol), 4,4'-dihydroxydiphenyl (27.95, 0.150 mol) and diphenylsulphone (275.00 g) and purged with nitrogen for 1 hour. The contents were then heated under a nitrogen blanket to 160° C. to form an almost colourless solution. Whilst maintaining a nitrogen blanket, dried sodium carbonate (53.00 g, 0.500 mol) and potassium carbonate (0.35 g, 2.53×10³ mol), both sieved through a screen with a mesh size of 500 micrometres, were added. The temperature was raised to 200° C. at a rate of 0.75° C./min and then to 240° C. at a rate of 0.5° C./min before finally being heated to 305° C. at 1° C./min and held for approximately 200 minutes or until the desired SV was reaches as indicted by the torque rise on the stirrer. The required torque rise was determined from a calibration graph of torque rise versus SV.

The reaction mixture was then poured into a metal tray, allowed to cool, milled and washed with 2 litres of acetone and then with warm water at a temperature of 40-50° C. until the conductivity of the waste water was <2ρS. The resulting polymer powder was dried in an air oven for 12 hours at 120° C.

The resulting polymer had a Shear Viscosity (SV) of 122 Pa·s at a temperature of 400° C. and a shear rate of 1000 s⁻¹, as measured by capillary rheometry.

EXAMPLE 3—PREPARATION OF POLYETHERETHERKETONE (PEEK) POLYETHERDIPHENYLETHERKETONE (PEDEK) COPOLYMER AT 70:30 REPEAT UNIT RATIO

A 0.5 litre flanged Hastelloy pot fitted with a ground glass lid, stirrer/stirrer guide, nitrogen inlet and outlet was charged with 4,4'-diflurobenzophenone (110.95 g, 0.508 mol), 1,4-dihydroxybenzene (38.55 g, 0.350 mol), 4,4'-dihydroxydiphenyl (27.95, 0.150 mol) and diphenylsulphone (275.00 g) and purged with nitrogen for 1 hour. The contents were then heated under a nitrogen blanket to 160° C. to form an almost colourless solution. Whilst maintaining a nitrogen blanket, dried sodium carbonate (53.00 g, 0.500 mol) and potassium carbonate (2.75 g, 0.020 mol), both sieved through a screen with a mesh size of 500 micrometres, were added. The temperature was raised to 200° C. at a rate of 0.75° C./min and then to 240° C. at a rate of 0.5° C./min before finally being heated to 305° C. at 1° C./min and held for approximately 200 minutes or until the desired SV was reaches as indicted by the torque rise on the stirrer. The required torque rise was determined from a calibration graph of torque rise versus SV. The reaction mixture was then poured into a metal tray, allowed to cool, milled and washed with 2 litres of acetone and then with warm water at a temperature of 40-50° C. until the conductivity of the waste water was <2 μS. The resulting polymer powder was dried in an air oven for 12 hours at 120° C.

The resulting polymer had a Shear Viscosity (SV) of 131 Pa·s at a temperature of 400° C. and a shear rate of 1000 s⁻¹, as measured by capillary rheometry.

EXAMPLE 4—PREPARATION OF POLYETHERETHERKETONE (PEEK) POLYETHERDIPHENYLETHERKETONE (PEDEK) COPOLYMER AT 65:35 REPEAT UNIT RATIO

A 0.5 litre flanged Hastelloy pot fitted with a ground glass lid, stirrer/stirrer guide, nitrogen inlet and outlet was charged with 4,4'-diflurobenzophenone (110.95 g, 0.508 mol), 1,4-dihydroxybenzene (35.82 g, 0.325 mol), 4,4'-dihydroxydiphenyl (32.58, 0.175 mol) and diphenylsulphone (275.00 g) and purged with nitrogen for 1 hour. The contents were then heated under a nitrogen blanket to 160° C. to form an almost colourless solution. Whilst maintaining a nitrogen blanket, dried sodium carbonate (53.00 g, 0.500 mol) and potassium carbonate (2.75 g, 0.020 mol), both sieved through a screen with a mesh size of 500 micrometres, were added. The temperature was raised to 200° C. at a rate of 0.75° C./min and then to 240° C. at a rate of 0.5° C./min before finally being heated to 305° C. at 1° C./min and held for approximately 200 minutes or until the desired SV was reaches as indicted by the torque rise on the stirrer. The required torque rise was determined from a calibration graph of torque rise versus SV. The reaction mixture was then poured into a metal tray, allowed to cool, milled and washed with 2 litres of acetone and then with warm water at a temperature of 40-50° C. until the conductivity of the waste water was <2 μS. The resulting polymer powder was dried in an air oven for 12 hours at 120° C.

The resulting polymer had a Shear Viscosity (SV) of 186 Pa·s at a temperature of 400° C. and a shear rate of 1000 s⁻¹, as measured by capillary rheometry.

Measurement of Shear Viscosity

The shear viscosity, SV, was measured according to a Standard method as defined in ISO11443:2014 using capillary rheometry operating at 400° C. at a shear rate of 1000 s⁻¹ using a circular cross-section tungsten carbide die, 0.5 mm (capillary diameter)×8 mm (capillary length). The range of SV of the polymeric material selected was from around 100 Pa·s to around 400 Pa·s, at 400° C.

Comparative Examples

Preparation of polyetheretherketone (PEEK)-polvetherdiphenyletherketone (PEDEK) Copolymer on a 200 mol Scale A 300 litre vessel fitted with a lid, stirrer/stirrer guide, nitrogen inlet and outlet was charged with diphenylsulphone (125.52 kg) and heated to 150° C. Once fully melted 4.4'-diflurobenzophenone (44.82 kg, 205.4 mol), 1,4-dihydroxybenzene (16.518 kg, 150 mol) and 4,4'-dihydroxydiphenyl (9.311 kg, 50 mol) were charged to the vessel. The contents were then heated to 160° C. While maintaining a nitrogen blanket, dried sodium carbonate (21.368 kg, 201.6 mol) and potassium carbonate (1.106 kg, 8 mol), both sieved through a screen with a mesh of 500 micrometres, were added.

The temperature was raised to 180° C. at 1° C./min and held for 100 minutes. The temperature was raised to 200° C. at 1° C./min and held for 20 minutes. The temperature was then raised to 305° C. at 1° C./min and held until desired melt viscosity was reached, as determined by the rise in torque required to rotated the agitator. The required torque rise was determined from a calibration graph of torque rise versus SV. The reaction mixture was poured via a band caster into a water bath, allowed to cool, milled and washed with acetone and water. The resulting polymer powder was dried in a tumble dryer until the contents temperature measured 112° C.

The resulting polymer had a Shear Viscosity (SV) of 250 Pa·s at a temperature of 400° C. and a shear rate of 1000 s⁻¹, as measured by capillary rheometry.

Victrex PEEK 151 and Victrex PAEK AM 200 were obtained from Victrex Manufacturing Limited, Thornton Cleveleys, United Kingdom.

Measuring Crystallinity Half Life of the PAEK Materials

Crystallisation study was carried out using Differential Scanning Calorimetry, DSC. Isothermal crystallisation half life is defined as the time consumed to reach half of the final crystallinity and is determined by integration of isothermal heat flow measurements.

The isothermal crystallisation half-life was determined using the following DSC method.

A dried sample of each polymer was compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. An 8 mg plus or minus 3 mg sample of each film was scanned by DSC as follows:

The sample was first heated to 30° C. and allowed to equilibrate for 15 mins. It was then heating to 400° C. at 20° C./minute, and held at this temperature for 15 minutes. The sample was then cooled at 20° C./minute to the desired isotherm temperature (typically 270-290° C.) and held isothermally for up until 3 hours, until crystallisation was complete. It was then cooled back to ambient temperature at 20° C./minute.

From the DSC trace resulting from the scan the heat flow data at the isothermal crystallisation temperature were obtained and plotted. Crystallisation half-life was taken to be the time from the start of the isothermal hold (at the crystallisation temperature) to the time when the crystalline level reached one half of its ultimate level.

The modified crystallisation kinetics may be defined by a set of Avrami kinetics. The Avrami equation describes how solids transform from one phase to another at a constant temperature. In this example it is employed to study the crystallisation kinetics of various polyaryletherketone polymers. The Avrami exponent and rate constant for the isothermal crystallisation process can be determined experimentally using differential scanning calorimetry.

The Avrami equation is presented below $$X_t = [1 - \exp(-Zt^n)]$$

Z=rate constant incorporating growth rate and characteristics of crystallite growth
Xt=the volume of fraction crystallised material at time t
n=the Avrami exponent which adopts different values depending on the crystallisation mechanism involved The standard Avrami equation can then be expressed as the equation of a straight line where the components are representative of y=mx+c respectively $$\log\left[-\ln\left(1 - \frac{X_t}{X_\infty}\right)\right] = n \log t + \log Z$$

This is then then be used to experimentally determine the kinetic data for the rate constant (Z), half-life (t½), and the Avrami constant (n).

DISCUSSION

The materials of the present invention are particularly useful in additive manufacturing processes because the crystallisation behaviours are modified to suit such processes. In conventional polymer processing in operations such as injection moulding, all of the polymeric material that later goes on to form the article or object is molten at the same time. This means that the melt is a homogenous mixture, with the backbone chains in the polymer evenly dispersed. As the article cools and crystallises, this homogeneity of the polymer chains is locked into the morphology of the article.

In an additively manufactured article however, the layer wise manufacturing processing and resultant structure means that polymer chains are not homogenously dispersed, and do not traverse the boundaries between subsequent layers well. This is because the new layer is typically added to a now solid layer and cannot mix with the preceding layer. We have surprisingly found that one way of overcoming this problem is to use a slow-crystallising polymer which remains molten for sufficient time after being printed for example, for the following layer to be printed onto it. This has been shown to improve mixing at the interface between layers, in turn resulting improved mechanical properties on the article.

The described and illustrated embodiments are to be considered as illustrative and not restrictive in character, it being understood that preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim.

The invention claimed is:

1. A polyaryletherketone PAEK polymeric material comprising a homopolymer and/or a copolymer, suitable for use in an additive manufacturing process to make an object, wherein the PAEK polymeric material has a shear viscosity, SV, of at least 145 Pa·s and less than 350 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 12 minutes at a temperature of 280° C., measured by Differential Scanning Calorimetry, DSC.

2. A PAEK polymeric material according to claim 1, wherein a co-monomer unit with a phenyl group is incorporated into the PAEK homopolymer.

3. A PAEK polymeric material according to claim 1, wherein the PAEK polymeric material is a PAEK copolymer.

4. A PAEK polymeric material according to claim 3, wherein, the PAEK copolymer is a polyetherketoneketone, PEKK.

5. A PAEK polymeric material according to claim 3, wherein the copolymer comprises repeat units of formula

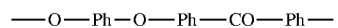

I and a repeat unit of formula

II wherein Ph represents a phenylene moiety, wherein at least 95 mol % of the copolymer repeat units are repeat units of formula I and of formula II; wherein the repeat units I and II have a molar ratio I:II from 60:40 to 80:20.

6. A PAEK polymeric material according to claim 3, wherein the copolymer comprises repeat units of formula

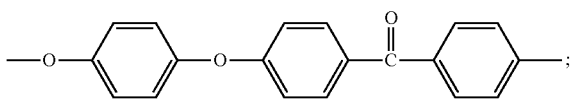

III and repeat units of formula

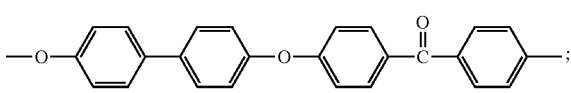

IV wherein at least 95 mol % of the copolymer repeat units are repeat units of formula III and of formula IV; wherein the repeat units III and IV have a molar ratio III:IV from 60:40 to 80:20.

7. An automated fibre placement process, AFP, comprising applying sequential layers of fibre to form a composite part, wherein the fibre comprises the PAEK polymeric material of claim 1, wherein the PAEK polymeric material has a shear viscosity, SV, of at least 200 Pa·s and less than 280 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 20 mins and less than 50 mins at 290° C.

8. A powder bed fusion process comprising forming a component from a polymeric material in a layer by layer process, wherein the polymeric material is the PAEK polymeric material of claim 1, wherein the PAEK polymeric material has a shear viscosity, SV, of at least 240 Pa·s and less than 350 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 40 mins and less than 80 mins at 290° C.

9. The process according to claim 8, wherein the PAEK polymeric material is a copolymer and has a repeat unit ratio of at least 62:38 and less than 68:32.

10. The process according to claim 9, wherein the copolymer has a particle size distribution, PSD, with a D50 range from 45 to 60 μm, a D10>14 μm and a D90<136 μm.

11. A filled filament fusion fabrication process comprising extruding a filament in layers to form a three-dimensional component, wherein the filament comprises the PAEK polymeric material of claim 1 and further comprises a filler, wherein the PAEK homopolymer or copolymer has a shear viscosity, SV, of at least 145 Pa·s and less than 205 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 35 mins and less than 75 mins at 290° C.

12. An unfilled filament fusion fabrication process comprising extruding a filament in layers to form a three-dimensional component, wherein the consists essentially of the PAEK polymeric material of claim 1, wherein the PAEK homopolymer or copolymer has a shear viscosity, SV, of at least 200 Pa·s and less than 280 Pa·s, measured using capillary rheometry operating at 400° C. at a shear rate of 1000 s$^{-1}$ using a circular cross-section tungsten carbide die, 0.5 mm (capillary diameter)×8 mm (capillary length), and wherein the PAEK polymeric material has an isothermal crystallinity half life, $T_{1/2}$, of greater than 15 mins and less than 45 mins at 290° C.

13. An additive manufacturing process comprising forming an object from a polymeric material according to claim 1 in a layer by layer process.

14. A PAEK polymeric material according to claim 4, wherein the PEKK copolymer comprises a combination of PEKK repeat units whereby a proportion of the PEKK repeat units include-1,4-linkages and a proportion of the PEKK repeat units include-1,3-linkages.

* * * * *